UNITED STATES PATENT OFFICE.

MILLER J. ROGERS, OF NEW GLOUCESTER, MAINE.

IMPROVEMENT IN MEDICAL COMPOSITIONS.

Specification forming part of Letters Patent No. 172,828, dated February 1, 1876; application filed September 4, 1874.

*To all whom it may concern:*

Be it known that I, MILLER J. ROGERS, of New Gloucester, in the county of Cumberland and State of Maine, have invented a new and useful Medical Composition; and I do declare that the following is a full description of the ingredients and the mode of compounding same:

The nature and essential feature of my invention consist in the incorporating of the oil of fir into a lozenge, composed generally of the following ingredients and in the proportions as set forth. To make fifty lozenges, I take of—

Oil of fir, one-fourth of an ounce;
Tincture of lobelia, one-twelfth of an ounce;
Cayenne pepper, one grain;
White sugar, four ounces;. to which add solution of starch, gum-arabic, and gum-tragacanth, sufficient to mold into form. These are combined into lozenges of convenient shape and size, which are useful as an internal remedy for all affections of the throat and lungs.

The use of the tincture of lobelia and cayenne pepper may be dispensed with, or one used without the other, in preparing this lozenge.

What I claim as my invention, and desire to secure by Letters Patent, is—

A lozenge composed of oil of fir, tincture of lobelia, cayenne pepper, white sugar, and the necessary gums to form the lozenge, in about the proportions and for the purposes hereinbefore set forth and described.

MILLER J. ROGERS.

Witnesses:
S. W. ROBINSON,
BYRON D. VERRILL.